United States Patent
Chen et al.

(10) Patent No.: US 8,605,071 B2
(45) Date of Patent: Dec. 10, 2013

(54) APPARATUS FOR GENERATING OVER-DRIVE VALUES APPLIED TO LCD DISPLAY AND METHOD THEREOF

(75) Inventors: Jiunn-Kuang Chen, Hsinchu Hsien (TW); Chieh-huang Tu, Hsinchu Hsien (TW); Yen-Ting Chen, Hsinchu Hsien (TW); Yi-Chun Weng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1021 days.

(21) Appl. No.: 12/645,719

(22) Filed: Dec. 23, 2009

(65) Prior Publication Data
US 2010/0188382 A1 Jul. 29, 2010

Related U.S. Application Data

(60) Provisional application No. 61/146,666, filed on Jan. 23, 2009.

(51) Int. Cl.
*G06F 3/038* (2013.01)
*G09G 5/00* (2006.01)
*G09G 5/10* (2006.01)

(52) U.S. Cl.
USPC .......................................... 345/211; 345/690

(58) Field of Classification Search
None
See application file for complete search history.

(56) References Cited

U.S. PATENT DOCUMENTS

| | | | |
|---|---|---|---|
| 7,050,074 B1 * | 5/2006 | Koyama | 345/690 |
| 2004/0257310 A1 | 12/2004 | Yu et al. | |
| 2006/0152535 A1 * | 7/2006 | Huang et al. | 345/690 |
| 2006/0158416 A1 * | 7/2006 | Ku | 345/98 |
| 2007/0097058 A1 * | 5/2007 | Kim et al. | 345/98 |
| 2007/0164949 A1 * | 7/2007 | Lee et al. | 345/87 |
| 2007/0216629 A1 * | 9/2007 | Oh et al. | 345/98 |
| 2008/0106544 A1 * | 5/2008 | Lee et al. | 345/214 |
| 2008/0198115 A1 * | 8/2008 | Lin et al. | 345/89 |
| 2010/0007595 A1 * | 1/2010 | Chiang et al. | 345/98 |

FOREIGN PATENT DOCUMENTS

| | | |
|---|---|---|
| TW | 200841309 | 10/2008 |
| TW | 200849204 | 12/2008 |

OTHER PUBLICATIONS

Taiwan IntellectualProperty Office, Office Action, Mar. 12, 2013, Taiwan.

* cited by examiner

*Primary Examiner* — Nicholas Lee
(74) *Attorney, Agent, or Firm* — WPAT, PC; Justin King (57) ABSTRACT

An over-drive value generating apparatus applied to an LCD display includes a pixel value converting unit, a gain generating unit and a calculation unit. The pixel value converting unit generates a converted pixel according to a current pixel of a current image and a corresponding pixel of a previous image. The gain generating unit generates a gain according to a position of the current pixel. The calculation unit generates an output pixel according to the current pixel, the converted pixel and the gain.

18 Claims, 9 Drawing Sheets

APPARATUS FOR GENERATING OVER-DRIVE VALUES APPLIED TO LCD DISPLAY AND METHOD THEREOF

CROSS REFERENCE TO RELATED PATENT APPLICATION

This patent application is based on Taiwan, R.O.C. patent application No. 61/146,666 filed on Jan. 23, 2009.

FIELD OF THE INVENTION

The present invention relates to an over-drive value generating apparatus applied to an LCD display and a method thereof, and more particularly, to an over-drive value generating apparatus applied to an LCD display for displaying 3 dimensional (3D) stereo images and a method thereof.

BACKGROUND OF THE INVENTION

In the recent years, 3D stereo image display has become a development direction of the industry to provide a better visual perception to viewers. Different from a normal display, the 3D stereo image display needs to respectively provide proper images to the left eye and the right eye of a viewer such that the viewer may then form a mental image of the 3D stereo image.

In the 3D stereo display technology, the 3D stereo display associated with a time sequence is considered quite mature. That is, images of the left eye and images of the right eye are alternately displayed on the basis of a time sequence so that the eyes of the viewer perceive the left-eye images and the right-eye images alternately. More particularly, the left eye of the viewer only perceives the left-eye images and the right eye of the viewer only perceives the right-eye images. For example, a pair of 3D glasses, having a left-eye shutter and a right-eye shutter, associated with a display capable of alternately displaying the left-eye images and the right-eye images, can provide 3D stereo images to the viewer.

Figure 1:
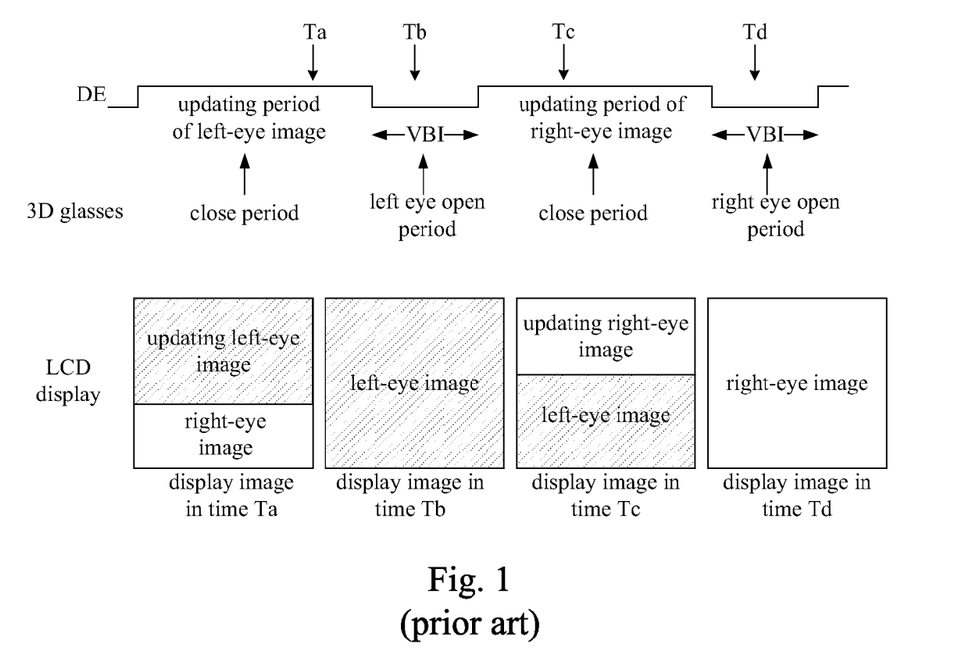
FIG. 1 is a schematic diagram of a display timing control of a 3D stereo image by an LCD display and a pair of 3D glasses.

FIG. 1 is a schematic diagram of a display timing control of 3D images displayed by an LCD display and a pair of 3D glasses. Referring to FIG. 1, the LCD display alternately displays left-eye images and right-eye images. Since the LCD display is a hold-type display, each of the pixels of the LCD display displays current pixel data continuously. Therefore, as shown in the diagram, during updating a display image of the LCD display with a left-eye image, the display image actually contains not only an updated left-eye image, but also a right-eye image that is not yet updated. Likewise, during updating the display image of the LCD display with a right-eye image, the display image actually contains not only an updated right-eye image, but also a left-eye image that is not yet updated. In order to avoid crosstalk, the pair of 3D glasses is only correspondingly switched to an open state during vertical blanking intervals (VBIs). That is, a left-eye shutter of the 3D glasses is opened during the VBI after the left-eye images have been updated, and when the current display image begins to be updated with the right-eye images, both of the shutters of the 3D glasses are closed.

The over-drive technology widely used for improving the response time of an LCD display generates an over-drive pixel value according to a pixel value of each of the pixels of a current image and a pixel value of a previous image. The over-drive pixel value is used for driving a corresponding LCD molecule, thus a rotational speed of which becomes faster to improve the response time of the LCD display.

Figure 2:
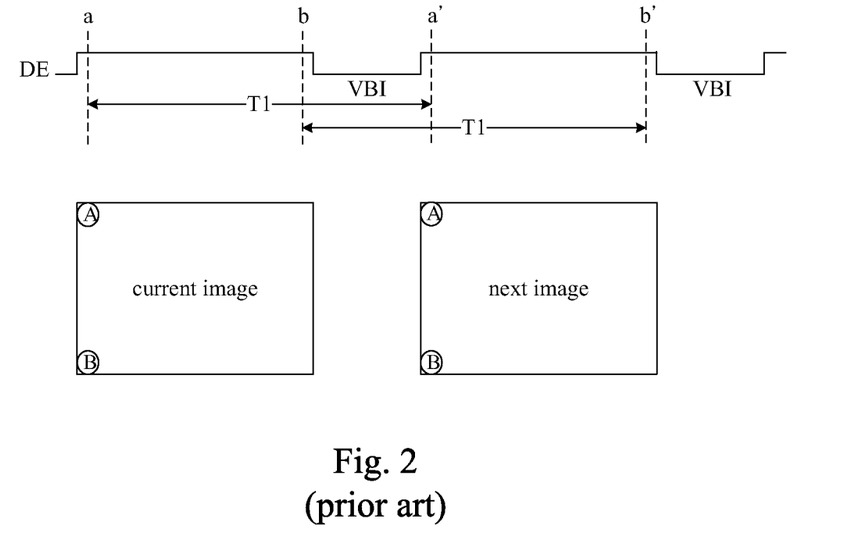
FIG. 2 is a schematic diagram of a pixel updating time of an LCD display under normal circumstances.
Figure 3:
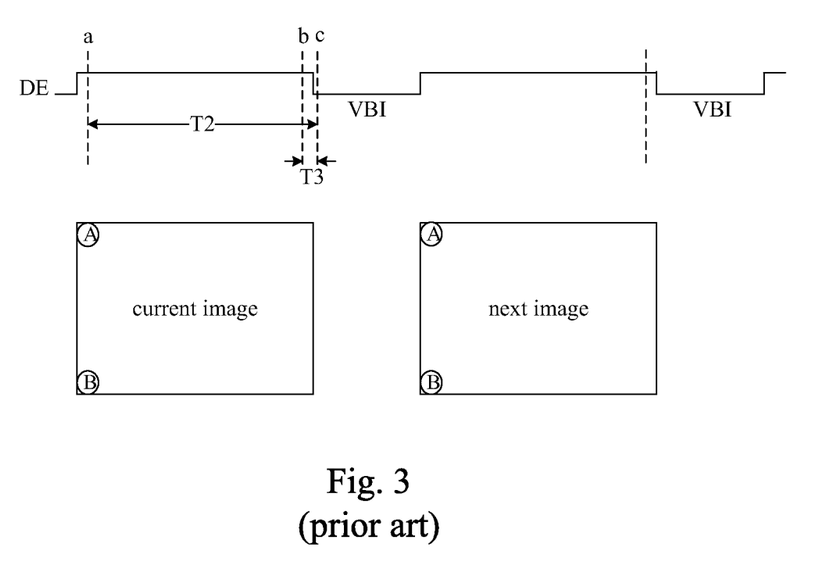
FIG. 3 is a schematic diagram of a pixel updating time of an LCD display for a 3D stereo display.

Under normal display circumstances, regardless of whether the display image is updated, a viewer continuously views the display image. Therefore, each of the pixels of the LCD display has a same updating time. FIG. 2 is a schematic diagram of timing of updating pixels of the LCD display under the normal display circumstances. Referring to FIG. 2, for a data enable signal DE, a point "a" represents a data updating time point of a current image corresponding to a pixel cell A of an LCD display, and "a'" point represents a data updating time point of a next image corresponding to the pixel cell A. Similarly, points "b" and "b'" of the data enable signal DE respectively represent a data updating time point of the current image corresponding to a pixel cell B and a data updating time point of the next image corresponding to the pixel cell B. The pixel cell A has a time length T1 from the updating time point "a" of the current image to the updating time point "a'" of the next image, and the pixel cell B has the same time length T1 from the updating time point "b" of the current image to the updating time point "b'" of the next image. Accordingly, under normal circumstances, pixel cells of the LCD display have a same updating time. However, in the foregoing application of the 3D stereo display, the pair of 3D glasses is only switched to the open state during the VBI as illustrated in FIG. 3. The pixel cell A has a time length T2 from the updating time point "a" of the current image to a 3D glasses open time point "c" within the VBI, and the pixel cell B has a time length T3 from the updating time point "b" of the current image to the 3D glass open time point "c". In order to gain a preferred display effect, LCD molecules of the pixel cells A and B should turn to desired degrees before the pair of 3D glasses is switched to the open state. That is, the pixel cell A has an updating time of the time length of T2, and the pixel cell B has an updating time of the time length of T3. Therefore, in the application of the 3D stereo display, pixel cells closer to the bottom of the LCD display have shorter updating times. However, in the conventional over-drive technology, each of the pixel cells is supposed to have the same updating time. When the pixel cells are applied to the 3D stereo display, it is unlikely that a good display effect can be obtained.

SUMMARY OF THE INVENTION

One object of the present invention is to provide an over-drive value generating apparatus and a method thereof. The apparatus is applied to a 3D stereo display to improve display quality of displaying a 3D stereo image by an LCD display.

In order to achieve the foregoing object, an over-drive value generating apparatus applied to a display device is provided according to the present invention. The apparatus comprises a pixel value converting unit, a gain generating unit, and a calculation unit. The pixel value converting unit generates a converted pixel value of a pixel according to a current pixel value of a current image and a previous pixel value of a previous image. The gain generating unit generates a gain according to a position of the pixel. The calculation unit generates an output pixel value according to the current pixel value, the converted pixel value and the gain.

In order to achieve the foregoing object, an over-drive value generating method applied to a display device is provided according to the present invention. The method comprises generating a converted pixel value of a pixel according a current pixel value of a current image and a previous pixel value of a previous image, generating a gain according to a position of the pixel, and generating an output pixel value according to the current pixel value, the converted pixel value and the gain.

An over-drive value generating apparatus and a method thereof provided according to the present can effectively solve a problem that a conventional over-drive technology cannot be adaptively applied to a 3D display.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

The invention provides an over-drive value generating apparatus and an over-drive value generating method applied to a display. According to the over-drive value generating apparatus and the over-drive value generating method of the present invention, proper over-drive pixel values are generated so that a good display effect is obtained in applications to a 3D stereo display.

Figure 4:
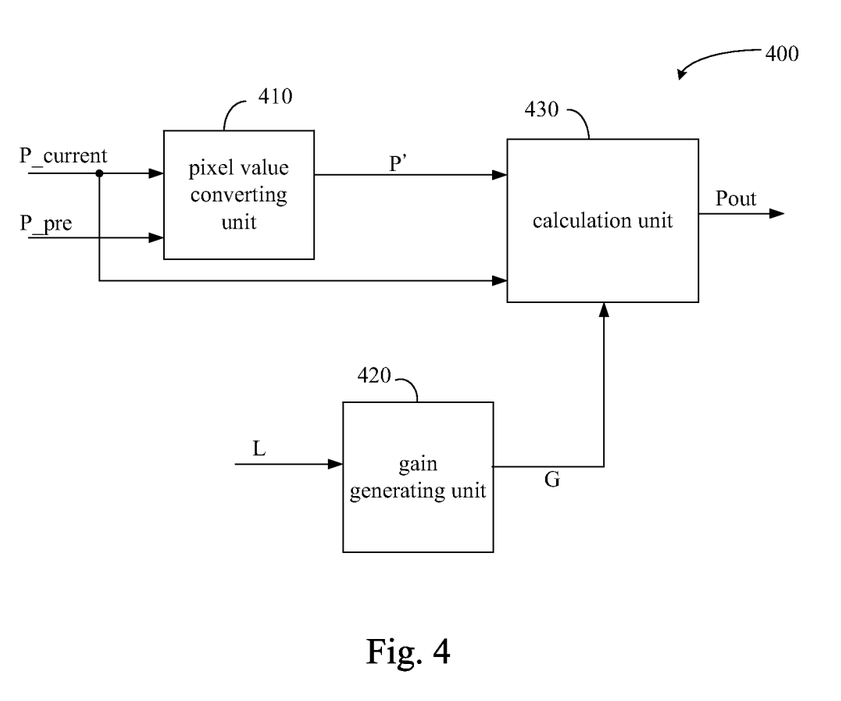
FIG. 4 is a schematic diagram of an over-drive value generating apparatus in accordance with an embodiment of the present invention.

FIG. 4 is a schematic diagram of an over-drive value generating apparatus in accordance with an embodiment of the present invention. An over-drive value generating apparatus 400 comprises a pixel value converting unit 410, a gain generating unit 420 and a calculation unit 430. The pixel value converting unit 410 generates a converted pixel value P' according to a current pixel value P_current of a pixel of a current image and a previous pixel value P_pre of a corresponding pixel of a previous image. Generally speaking, the corresponding pixel of the previous image is a pixel at a same display position as the pixel of the current image, and the previous image is before the current image. The gain generating unit 420 generates a gain value G according to a position L of the pixel. In an embodiment, the gain generating unit 420 generates the gain value G according to a position of the pixel in the vertical direction. As the position L of the pixel gets closer to the bottom of the display, a gain value G generated by the gain generating unit 420 gets greater. The calculation unit 430 generates an output pixel value Pout according to the current pixel value P current, the converted pixel value P' and the gain value G.

Figure 5:
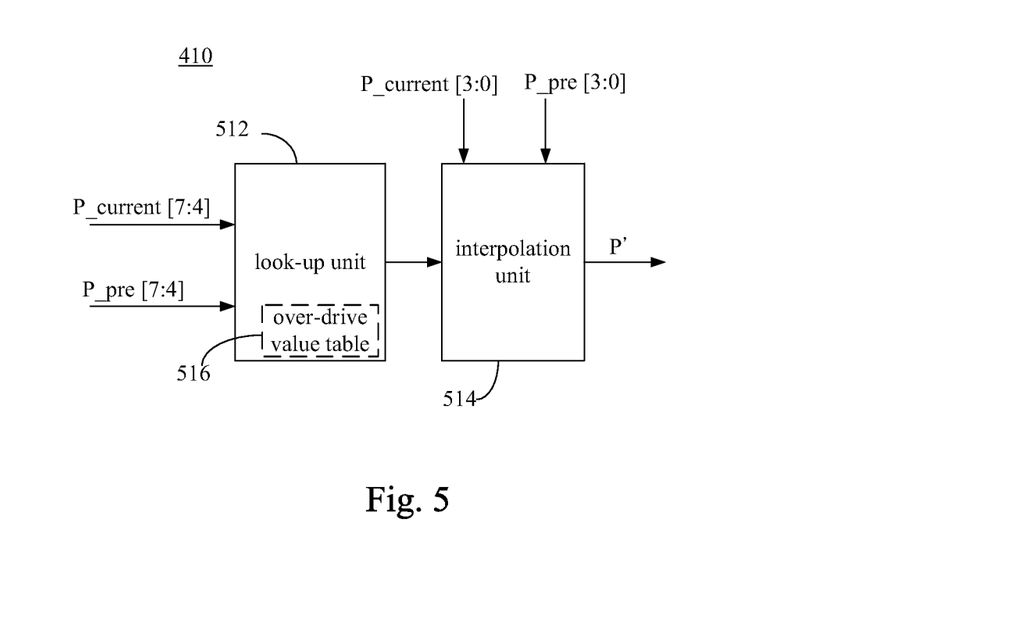
FIG. 5 is a schematic diagram of a pixel value converting unit of an over-drive value generating apparatus in accordance with a preferred embodiment of the present invention.

In an embodiment, the pixel value converting unit 410 comprises an over-drive value table to be described in FIG. 5 in detail. The pixel value converting unit 410 inquires the over-drive value table according the current pixel value P_current and the previous pixel value P_pre to obtain the converted pixel value P'. However, the over-drive value table needs a rather large memory space to completely correspond to all pixel values. That is, a memory with high capacity is needed. In a preferred embodiment, the pixel value converting unit 410 uses a smaller over-drive value table together with an interpolation unit to generate the converted pixel value P', so as to save memory space. FIG. 5 is a schematic diagram of a pixel value converting unit of an over-drive value generating apparatus in accordance with a preferred embodiment of the present invention. The pixel value converting unit 410 comprises a look-up unit 512 and an interpolation unit 514. In this embodiment, the current pixel value P_current and the previous pixel value P_pre are 8-bit data. The look-up unit 512 inquires the over-drive value table 516 according to four most significant bits (MSBs) of the current pixel value P_current and four MSBs of the previous pixel value P_pre. The interpolation unit 514 performs an interpolation according to four least significant bits (LSBs) of the current pixel value P_current and four LSBs of the previous pixel value P_pre, so as to generate a converted pixel value P'. FIG. 5 shows a pixel value converting unit in accordance with an embodiment; however, it shall not be construed as limiting the scope of the invention. In other embodiments, the current pixel value P_current and the previous pixel value P_pre can be N-bit data. The look-up unit 512 applies M MSBs of the current pixel value P_current and M MSBs of the previous pixel value P_pre to inquire the over-drive value table. By applying N-M LSBs of the current pixel value P_current and N-M LSBs of the previous pixel value P_pre, the interpolation unit then performs an interpolation on the inquired values obtained from the over-drive value table to further generate the converted pixel value P', where N and M are positive integers.

In an embodiment, the gain generating unit 420 comprises a gain value table that in advance stores a corresponding gain value with respect to each of pixel positions. Accordingly, the gain generating unit 420 inquires the gain value table according to a position L of the pixel to obtain a gain value G. In an application of a 3D stereo display, the gain value table stores gain values corresponding to the pixel positions in a vertical direction in advance. Since pixels closer to the bottom of the display have shorter updating times, the gain value table provides greater gain values to the pixels closer to the bottom of the display to shorten the response time needed by the pixels. In addition, the gain generating unit 420 compensates with respect to unevenness phenomenon of the display by measuring display characteristics of the pixel positions in the horizontal direction and the vertical direction in advance. For example, brightness of the pixel positions is measured in advance to generate corresponding compensation gain values. The compensation gain values are further combined with gain values need by the pixel positions in the vertical direction of a 3D display stereo application, so as to generate final gain values to be stored in the gain value table. Therefore, the gain generating unit 420 obtains a preferred gain value G with respect to a position L of the pixel, where the position L comprises positions in the horizontal and vertical directions.

Figure 6:
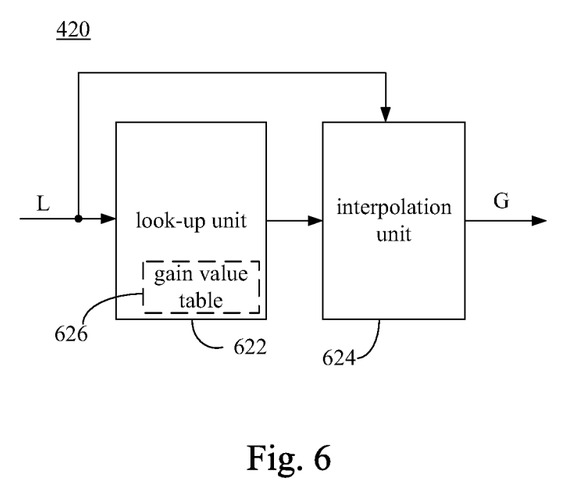
FIG. 6 is a schematic diagram of a gain generating unit of an over-drive value generating apparatus in accordance with an embodiment of the present invention.

FIG. 6 is a schematic diagram of a gain generating unit of an over-drive value generating apparatus in accordance with an embodiment of the present invention. The gain generating unit 420 comprises a look-up unit 622 and an interpolation unit 624. The look-up unit 622 has a gain value table 626 that in advance stores gain values corresponding to the pixel positions. The look-up unit 622 further inquires the gain value table 626 according a pixel position L of a pixel to be processed, so as to generate an output value. For example, a display image of the display is divided into 16 areas, which are formed by horizontally dividing the display image into 4 areas and then vertically dividing into 4 areas. However, the display image can also be vertically divided into 16 areas. The gain value table 626 stores gain values corresponding to the 16 areas. According a pixel position L of a pixel to be processed, the look-up unit 622 further determines an area of the pixel and inquires corresponding gain values from the gain value table 626. Each of the areas corresponds to at least one or more gain values. In a preferred embodiment, the gain value 626 is stored with two gain values for each area. Therefore, the look-up unit 622 obtains two gain values according to the pixel position L of the pixel to be processed. The interpolation unit 624 further performs an interpolation according to the pixel position L of the pixel to be processed and inquired values obtained by the look-up unit 622, so as to generate a gain value G. In addition to reducing memory capacity needed by the gain value table 626, the interpolation unit 624 also smoothes gain values corresponding to different pixel positions, so as to avoid undesirable influences on display quality caused by a large difference between gain values of adjacent pixel positions.

In the foregoing embodiment, the gain generating unit 420 obtains the gain value G by inquiring the gain value table. However the method of generating the gain value G by the gain generating unit 420 is not limited to the method as disclosed in the foregoing embodiments. For example, the gain generating unit 420 may apply a function involving a pixel position as a variable for representing gain value, and calculate the gain value G according to the function and the pixel position L of the pixel to be processed. In the application of the 3D stereo display, the value of the function is associated with a pixel position in the vertical direction. More particularly, as the pixel position of the pixel to be processed becomes closer to the bottom of the display, the value of the function becomes larger.

After the pixel value converting unit 410 has generated the converted pixel value P' and the gain generating unit 420 has generated the gain value G, the calculation unit 430 adjusts the converted pixel value P' according to the current pixel value P_current and the gain value G to generate an output pixel value Pout. In an embodiment, the output pixel value Pout is represented as:

$$Pout=(1-G)*(P\_current)+G*P'$$

Consequently, the obtained output pixel value Pout can achieve an object of over-driving LCD molecules and is also suitable for the application of 3D stereo display.

Figure 7:
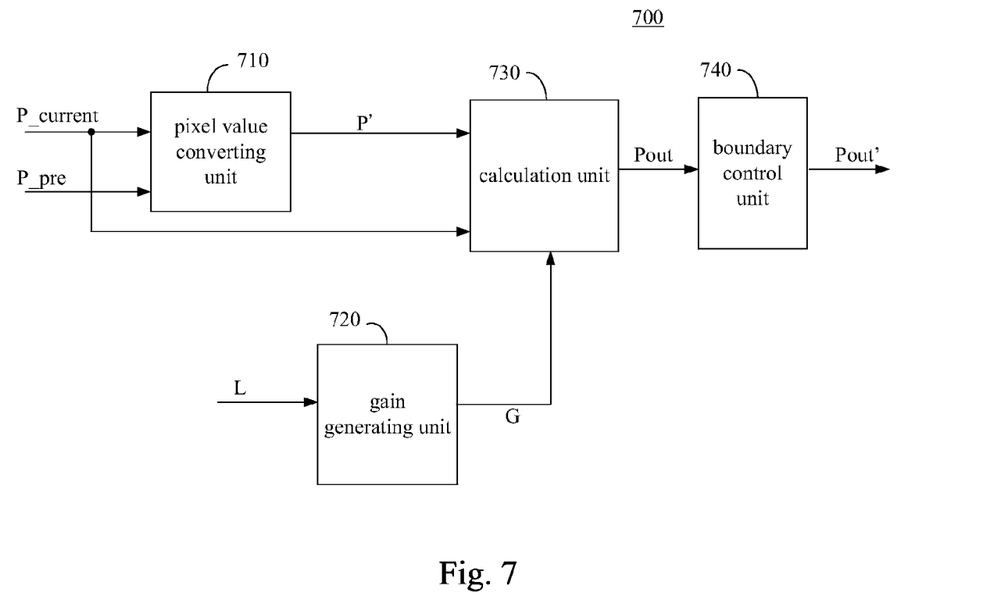
FIG. 7 is a schematic diagram of an over-drive value generating apparatus in accordance with another embodiment of the present invention.

FIG. 7 is a schematic diagram of another embodiment of an over-drive value generating apparatus in accordance with another embodiment of the present invention. In this embodiment, an over-drive value generating apparatus 700 further comprises an boundary control unit 740 for controlling and maintaining the output pixel value Pout to be within a predetermined range, so as to ensure that a final output pixel value Pout' is a reasonable value. For example, in an 8-bit system, a reasonable pixel value is from 0 to 255, and the boundary control unit 740 determines whether the output pixel value Pout is greater than 255 or less than 0. When the output pixel value Pout is greater than 255, the boundary control unit 740 defines the final output pixel value Pout' as 255. When the output pixel value Pout is less than 0, the boundary control unit 740 defines the final output pixel value as 0.

Figure 8:
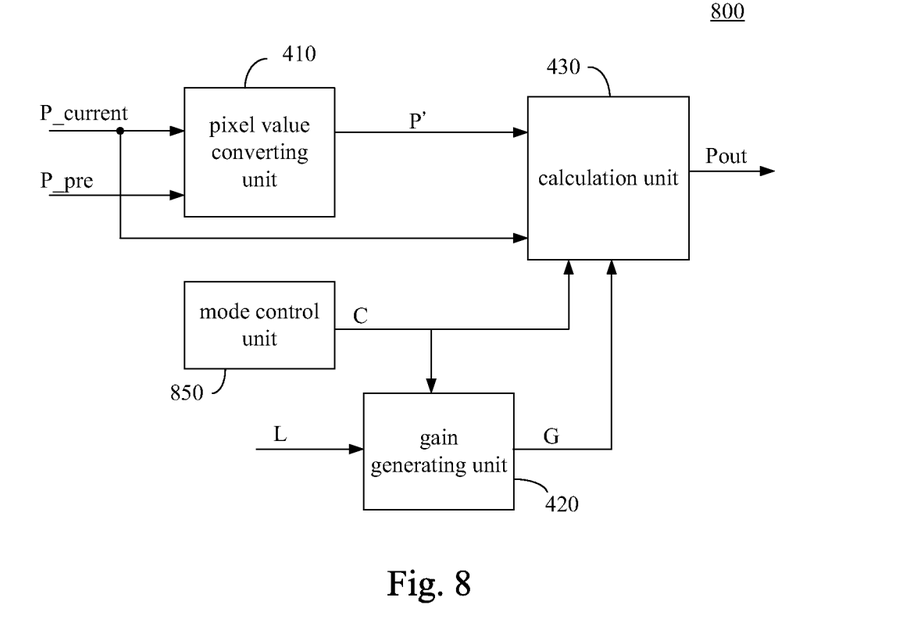
FIG. 8 is a schematic diagram of an over-drive value generating apparatus in accordance with another embodiment of the present invention.

FIG. 8 is an over-drive value generating apparatus in accordance with an embodiment of the present invention. In this embodiment, an over-drive value generating apparatus 800 further comprises a mode control unit 850 for controlling operation modes of the over-drive value generating apparatus 800, so as to generate a proper output pixel value Pout. For example, the operation modes comprise a 3D stereo display mode, and a 2D display mode also referred to as a normal display mode. In an embodiment, a user sets the mode control unit 850 to select the operation modes of the over-drive value generating apparatus 800. When the 3D stereo display mode is selected, the mode control unit 850 enables the gain generating unit 420 and the calculation unit 430 via a mode control signal C. Therefore, the gain generating unit 420 generates a gain value G according to a position of a pixel to be processed, and the calculation unit 430 generates an output pixel value Pout according to a current pixel P_current, a converted pixel value p' and the gain value G Accordingly, a final output pixel value Pout outputted by the over-drive generating apparatus 800 is substantially not equal to the converted pixel value P'. When the 2D display mode is selected, the mode control unit 850 disables the gain generating unit 420 and the calculation unit 430. Furthermore, the converted pixel value P' generated by the pixel value converting unit 410 is regarded as an output value of the over-drive value generating apparatus 800. In another embodiment, when the 2D display mode is selected, the mode control unit 850 controls the gain generating unit 420 via a mode control signal C to output a gain value of 1. Therefore, the output pixel value Pout is substantially equal to the converted pixel value P'.

In the embodiment illustrated in FIG. 8, the mode control unit 850 is comprised within the over-drive value generating apparatus 800. However, in another embodiment, an over-drive value generating apparatus without the mode control unit 850 is nevertheless also capable of switching between different operation modes. For example, the over-drive value generating apparatus selects an operation mode according to an external mode control signal, and the operation modes comprise a 3D display stereo mode and a 2D display mode. In the 3D display stereo mode, a gain generating unit generates a gain value G according to a position of a pixel to be processed, and a calculation unit generates an output pixel value Pout according to a current pixel value P_current, a converted pixel value P' and the gain value G. In the 2D display mode, the output pixel value Pout generated by the over-drive value generating apparatus is substantially equal to the converted pixel value P'.

Figure 9:
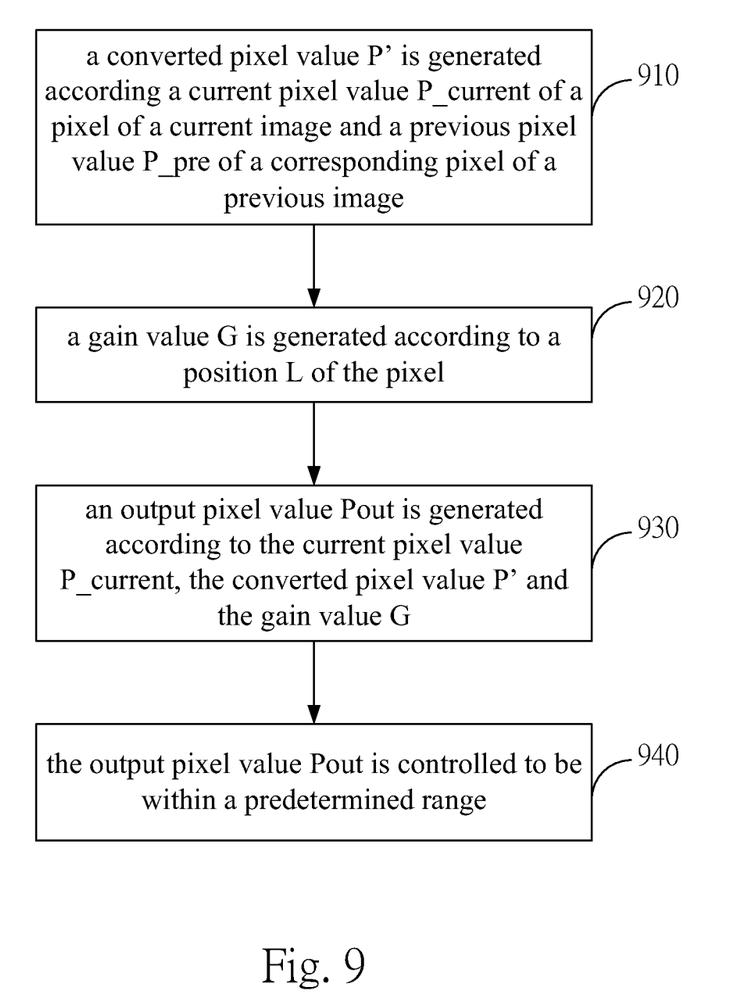
FIG. 9 is a flow chart of a method for generating over-drive values in accordance with an embodiment of the present invention.

The invention further provides an over-drive value generating method applied to a 3D stereo display. Refer to FIG. 9 showing a flow chart of an over-drive value generating method in accordance with an embodiment of the present invention. Note that on a premise that the same effect is achieved in practice, the steps of generating the flow need not be executed as the sequence shown in FIG. 9, and can be interleaved with other steps of the same flow.

In Step 910, a converted pixel value P' is generated according a current pixel value P_current of a pixel of a current image and a previous pixel value P_pre of a corresponding pixel of a previous image. In an embodiment, the converted pixel value P' is obtained by inquiring an over-drive value table according to the current pixel value P_current and the previous pixel value P_pre. In another embodiment, an output value is first obtained by inquiring an over-drive value table, followed by performing an interpolation on the obtained output value to generate the converted pixel value P'.

In Step 920, a gain value G is generated according to a position L of the pixel. In an embodiment, the gain value G is generated according to a position of the pixel in the vertical direction. Preferably, as the position L of the pixel becomes closer to the bottom of a display, the gain value G becomes larger.

In Step 930, an output pixel value Pout is generated according to the current pixel value P_current, the converted pixel value P' and the gain value G. In an embodiment, the output pixel value Pout is represented by the formula:

$$Pout=(1-G)*(P\_current)+G*P'$$

In Step 940, the output pixel value Pout is controlled to be within a predetermined range, so as to ensure that the output pixel value Pout is a reasonable value.

In conclusion, an over-drive value generating apparatus and a method thereof is provided according to the present invention. The over-drive value generating apparatus generates proper gain values according to positions of pixels to be processed and adjusts over-drive pixel values. Therefore, the final over-drive pixel values outputted can be applied to a 3D stereo display, thereby effectively improving display quality of the 3D stereo display applied to an LCD display.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An over-drive value generating apparatus, applied to a display device, comprising:
    a pixel value converting unit, for generating a converted pixel value for a pixel according to a current pixel value of a current image for the pixel and a previous pixel value of a previous image for the pixel;
    a gain generating unit, for generating a gain according to a position of the pixel; and
    a calculation unit, for generating an output pixel value according to the current pixel value, the converted pixel value, and the gain.

2. The over-drive value generating apparatus as claimed in claim 1, wherein the gain generating unit generates the gain according to the position, in a vertical direction, of the pixel.

3. The over-drive value generating apparatus as claimed in claim 1, wherein the gain gets larger as the position of the pixel gets closer to a bottom of a display image of the display device.

4. The over-drive value generating apparatus as claimed in claim 1, wherein the pixel value converting unit comprises a first look-up unit for inquiring an over-drive value table according to the current pixel value and the previous pixel value.

5. The over-drive value generating apparatus as claimed in claim 1, wherein the gain generating unit comprises a second look-up unit for inquiring a gain value table according to the position of the pixel.

6. The over-drive value generating apparatus as claimed in claim 5, wherein the gain generating unit further comprises an interpolation unit for performing an interpolation according to an inquired value obtained by inquiring the gain value table.

7. The over-drive value generating apparatus as claimed in claim 1, further comprising:
    a boundary control unit, for controlling the output pixel value to be within a predetermined range.

8. The over-drive value generating apparatus as claimed in claim 1, wherein the calculation unit generates the output pixel via an equation of P_out=(1−G)*(P_current)+G*P_t where the P_out represents the output pixel value, the G represents the gain, the P_current represents the current pixel value, and the P_t represents the converted pixel value.

9. The over-drive value generating apparatus as claimed in claim 1, wherein the over-drive value generating apparatus selects either a first operation mode or a second operation mode according to a mode control signal.

10. The over-drive value generating apparatus as claimed in claim 9, wherein when the over-drive value generating apparatus operates in the first operation mode, the output pixel value is not equal to the converted pixel value, and when the over-drive value generating apparatus operates in the second operation mode, the output pixel value is equal to the converted pixel value.

11. An over-drive value generating method, applied to a display device, comprising:
    generating a converted pixel value of a pixel according to a current pixel value of a current image and a previous pixel value of a previous image;
    generating a gain according to a position of the pixel; and
    generating an output pixel value according to the current pixel value, the converted pixel value, and the gain.

12. The over-drive value generating method as claimed in claim 11, wherein the gain is generated according the position, in a vertical direction, of the pixel.

13. The over-drive value generating method as claimed in claim 11, wherein the gain gets larger as the position of the pixel gets closer to a bottom of a display image of the display device.

14. The over-drive value generating method as claimed in claim 11, wherein the step of generating the converted pixel value of the pixel according to the current pixel value of the current image and the previous pixel value of the previous image further comprises:
    inquiring an over-drive value table according to the current pixel value and the previous pixel value.

15. The over-drive value generating method as claimed in claim 11, wherein the step of generating the gain according to the position of the pixel further comprises:
    inquiring a gain value table according to the position of the pixel.

16. The over-drive value generating method as claimed in claim 15, wherein the step of generating the gain according to the position of the pixel further comprises:
    performing an interposition according to an inquired value obtained by inquiring the gain value table.

17. The over-drive value generating method as claimed in claim 11, further comprising:
    controlling the output pixel value to be within a predetermined range.

18. The over-drive value generating method as claimed in claim 11, wherein in the step of generating the output pixel value according to the current pixel value, the converted pixel value, and the gain, the output pixel value is generated via an equation of P_out=(1−G)*(P_current)+G*P_t where P_out represents the output pixel value, G represents the gain, P_current represents the current pixel value, and P_t represents the converted pixel value.

* * * * *